Figure 1:
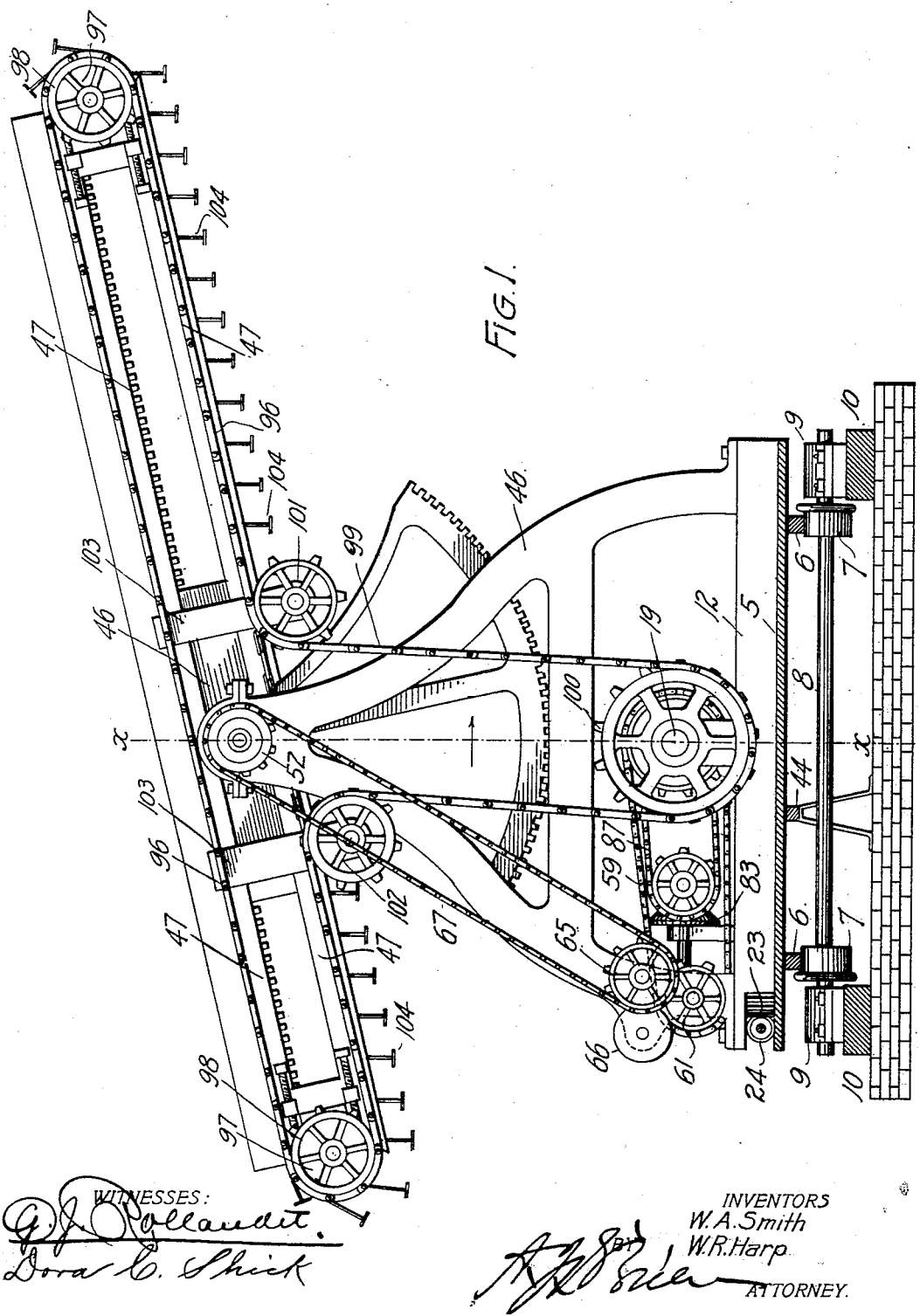

No. 710,902. Patented Oct. 7, 1902.
W. A. SMITH & W. R. HARP.
BOX CAR LOADER.
(Application filed June 8, 1901.)
(No Model.) 6 Sheets—Sheet 1.

No. 710,902. Patented Oct. 7, 1902.
W. A. SMITH & W. R. HARP.
BOX CAR LOADER.
(Application filed June 8, 1901.)
(No Model.) 6 Sheets—Sheet 2.

WITNESSES

INVENTORS
W. A. Smith.
W. R. Harp.
BY
ATTORNEY.

No. 710,902. Patented Oct. 7, 1902.
W. A. SMITH & W. R. HARP.
BOX CAR LOADER.
(Application filed June 8, 1901.)
(No Model.) 6 Sheets—Sheet 3.

WITNESSES:
INVENTORS:
W. A. Smith
W. R. Harp
ATTORNEY.

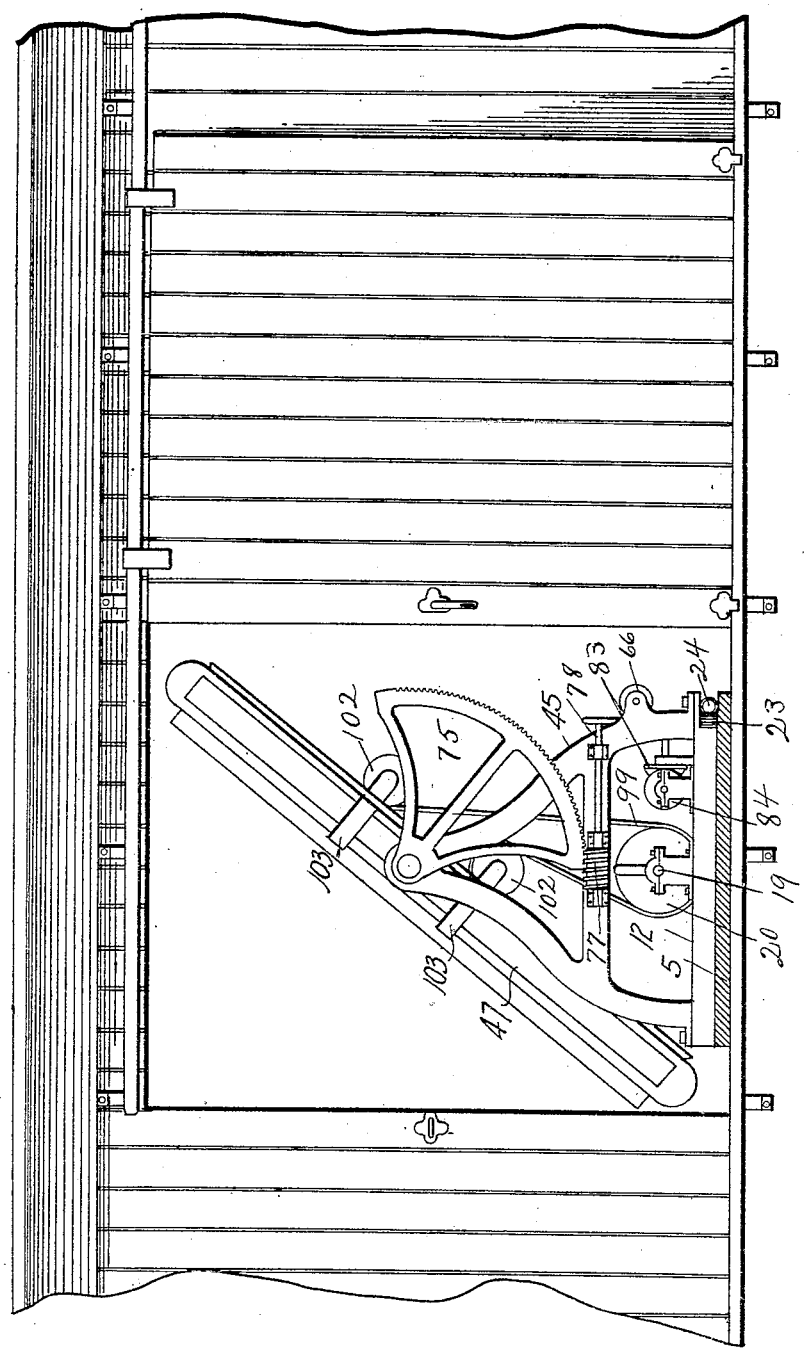

No. 710,902. Patented Oct. 7, 1902.
W. A. SMITH & W. R. HARP.
BOX CAR LOADER.
(Application filed June 8, 1901.)
(No Model.)
6 Sheets—Sheet 5.
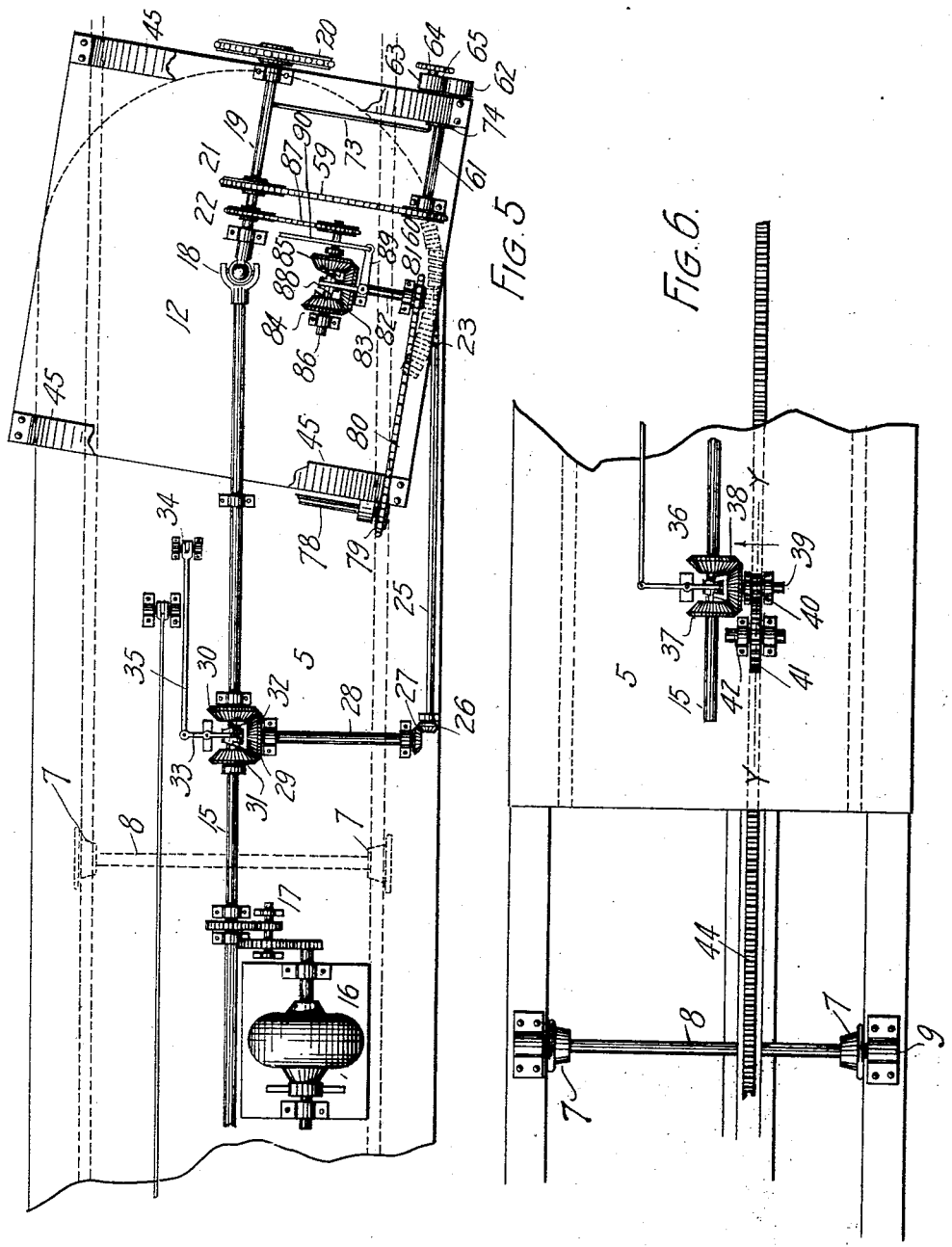
WITNESSES:
INVENTORS.
W. A. Smith,
W. R. Harp.
ATTORNEY.

No. 710,902.
Patented Oct. 7, 1902.
W. A. SMITH & W. R. HARP.
BOX CAR LOADER.
(Application filed June 8, 1901.)
(No Model.)
6 Sheets—Sheet 6.
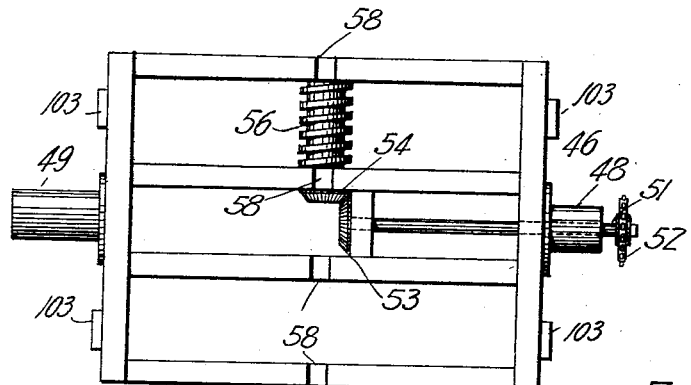
FIG. 7
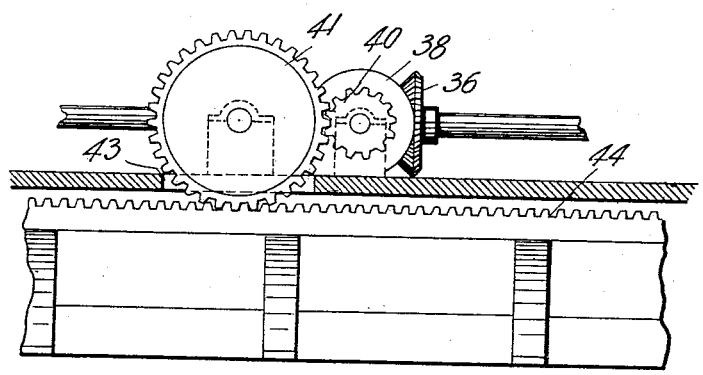
FIG. 8.
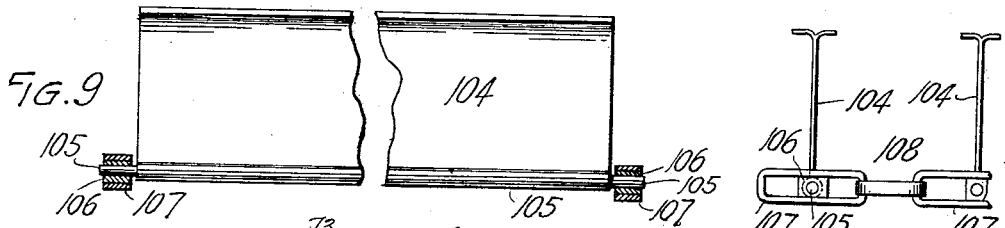
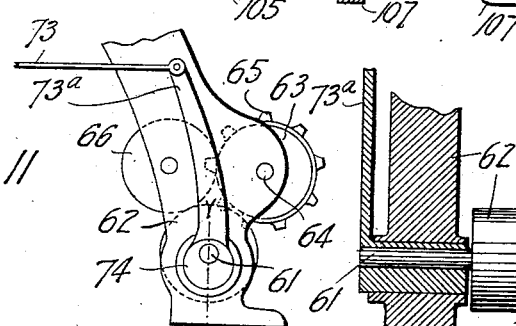
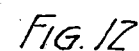
INVENTORS.
W. A. Smith
W. R. Harp.
ATTORNEY.

UNITED STATES PATENT OFFICE.

WILLIAM A. SMITH, OF AYLMER, AND WILLIAM R. HARP, OF DENVER, COLORADO; SAID SMITH ASSIGNOR TO SAID HARP.

BOX-CAR LOADER.

SPECIFICATION forming part of Letters Patent No. 710,902, dated October 7, 1902.

Application filed June 3, 1901. Serial No. 63,786. (No model.)

*To all whom it may concern:*

Be it known that we, WILLIAM A. SMITH, residing at Aylmer, in the county of Las Animas, and WILLIAM R. HARP, residing at Denver, in the county of Arapahoe, State of Colorado, citizens of the United States of America, have invented certain new and useful Improvements in Box-Car Loaders; and we do declare the following to be a full, clear, and exact description of the invention, such as will enable others skilled in the art to which it appertains to make and use the same, reference being had to the accompanying drawings, and to the figures of reference marked thereon, which form a part of this specification.

Our invention relates to improvements in apparatus for loading box-cars with coal and other materials, our object being to provide mechanism of this class which shall be comparatively simple in construction and thoroughly practicable in operation. It includes a conveyer slidably mounted on a suitable framework adapted to be run into the door of a box-car, together with a base upon which the framework is rigidly mounted, the base being adapted to turn on the end of the main platform or carriage, which is made to enter the car.

The invention also embodies means for tilting the conveyer to a convenient position for entering the car-door, and finally mechanism actuated by a suitable motor conveniently located for operating the main devices or mechanical elements of the apparatus.

This apparatus is more especially intended for loading box-cars with coal, though it is evident that it may be employed to equal advantage for loading other materials.

Having briefly outlined the construction and the function it is intended to subserve, we will proceed to describe the same in detail, reference being made to the accompanying drawings, in which—

Figure 2:
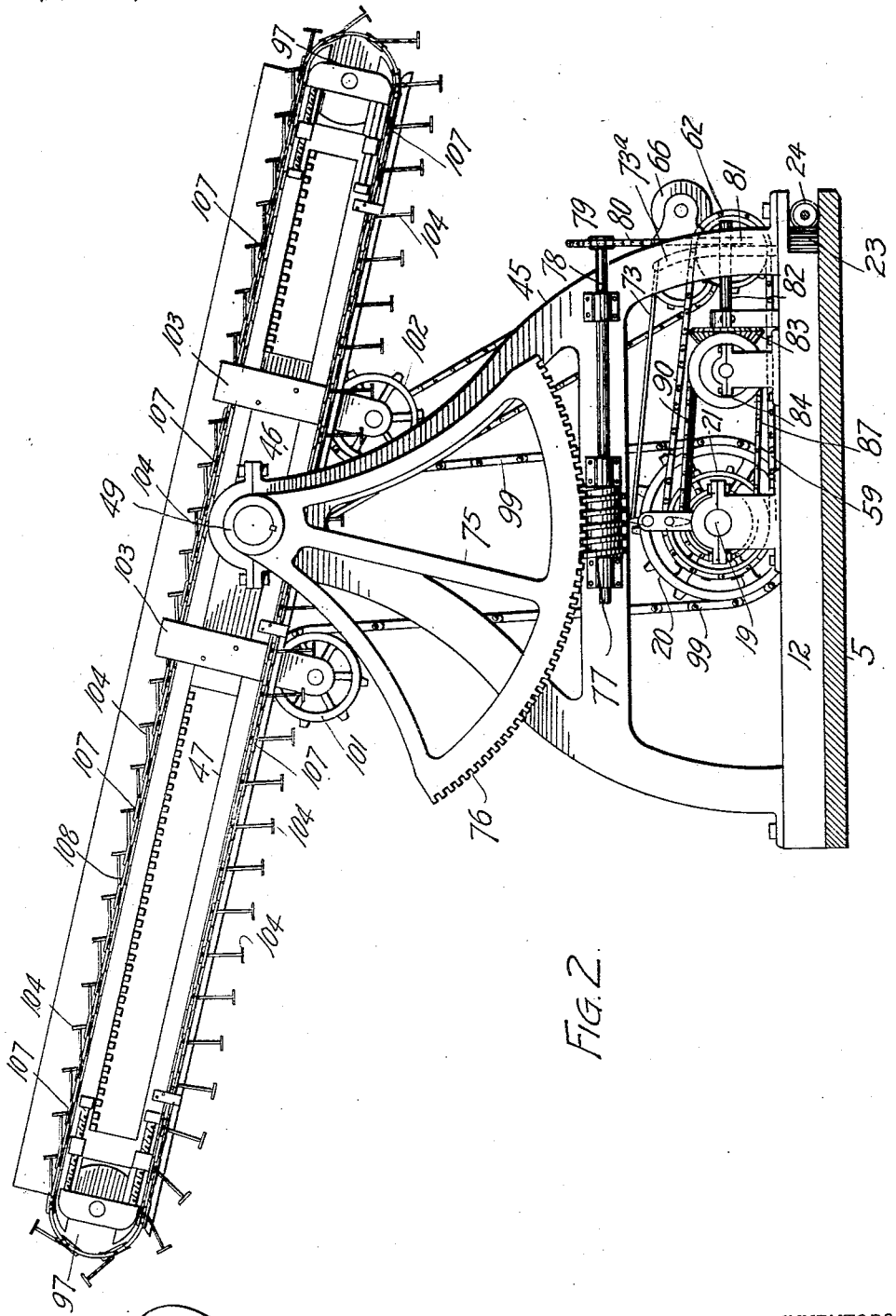
Figure 3:
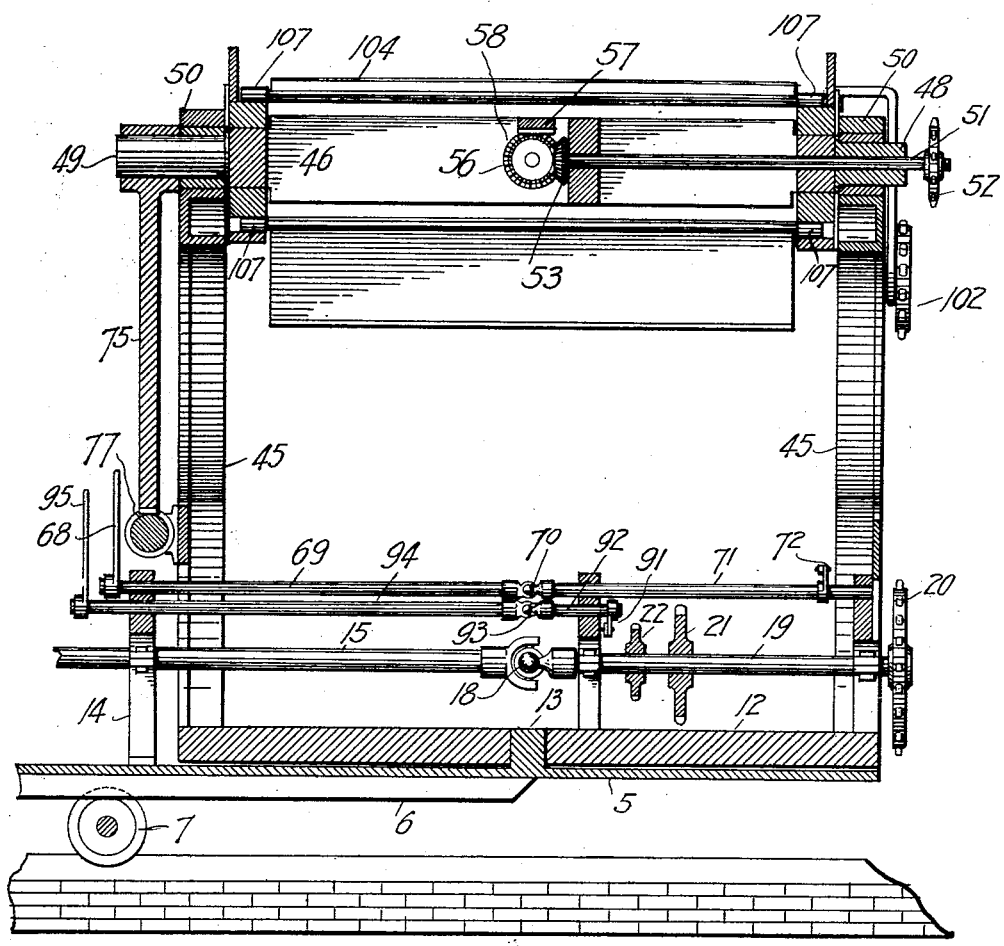

Figure 1 is a front end view of the apparatus, the platform being shown in cross-section. Fig. 2 is an opposite or rear view of the loader mechanism. Fig. 3 is a vertical cross-section taken through the center of the base on the line $x$ $x$, Fig. 1. Fig. 4 shows the loading mechanism located in a car, the conveyer being tilted to occupy a position extending diagonally of the door-opening in the side of the car. Figs. 5 and 6 taken together show a fragmentary plan view of the platform and the square revoluble base located at one end thereof, the loader mechanism being removed to facilitate clearness of illustration. Fig. 6 is a continuation of the left extremity of Fig. 5, being made a separate view because of the limited dimensions of the sheet. Fig. 7 is a plan view of the casting with which the conveyer is slidably connected. Fig. 8 is a section taken on the line $y$ $y$, Fig. 1, viewed in the direction of the arrow, the parts being shown on a larger scale. Figs. 9 and 10 are fragmentary end and side views of the conveyer-carrier. Fig. 11 is a fragmentary detail view of the friction-clutch mechanism, the parts being shown on a larger scale. Fig. 12 is a section on line $y$ $y$, Fig. 11.

The same reference characters indicate the same parts in all the views.

Let the numeral 5 designate a rectangular platform of a width adapted to enter the side door of a box-car. This platform is provided with tracks 6 on the under side engaging rollers 7, mounted on a shaft 8, journaled in bearings 9, mounted on a suitable stationary foundation 10. Upon the front end of the platform or that farthest to the right in Fig. 5 is revolubly mounted a base 12, preferably square. The base is adapted to turn on a bearing 13, made fast to the platform and entering an opening formed in the center of the base. (See Fig. 3.) Journaled in suitable bearings 14, mounted on the platform, is a line-shaft 15, extending longitudinally of the platform, the axis of the shaft being in the plane of the platform's longitudinal center. This shaft is constantly in motion during the operation of the machine and is actuated from a motor 16, with which it is connected by a train 17 of speed-reducing gears. The forward extremity of the shaft 15 is connected by a flexible joint 18 with a driving-shaft 19, upon which are mounted and made fast sprocket-wheels 20, 21, and 22. The sprockets are utilized in transmitting motion to various devices employed in the mechanism and whose construction and function will be hereinafter explained in detail. The center of the flexible joint 18 is located in a vertical line passed through the axis of the base 12. This base is provided at one side with a segmental gear 23 of any desired length, which gear is engaged by a worm 24 on a shaft 25, having a beveled gear 26 on its extremity remote from the worm, said gear meshing with a similar gear 27, fast on a shaft 28, whose opposite extremity is provided with a gear 29, arranged to mesh with two gears 30 and 31, loose on the line-shaft 15. Slidably mounted on the line-shaft between the loose gears 30 and 31 and turning with the shaft is a clutch member 32, arranged to be shifted by a lever 33 to engagement with the hub of either gear 30 or 31, according as it is desired to rotate the shaft 28 in the one direction or the other when it becomes necessary to turn the base 12 on the platform. The lever 33 is operated from a hand-lever 34 through the instrumentality of a rod 35, connecting the hand-lever 34 with the clutch-lever 33. Another set of reversing-gears (designated 36 and 37) (see Fig. 6) is also loosely mounted on the shaft 15 and arranged to mesh with the gear 30, fast on a shaft 39, upon which is also mounted a pinion 40, meshing with a gear 41, journaled on the platform, as shown at 42. This gear 41 passes through a slot 43 cut in the platform (see Fig. 8) and meshes with a stationary cog-rack 44, extending longitudinally underneath the platform and mounted on the foundation 10.

Mounted on the base 12 and projecting above the shaft 19 is a framework composed of two upright castings 45, whose lower extremities are made fast to the base. These castings are suitably separated, (see Fig. 3,) and in boxes attached to their upper extremities is trunnioned a cast block or cross-head 46, upon which the conveyer-frame 47 is mounted to slide in either direction, as circumstances may require. The trunnions or journals 48 and 49 of the casting 46 are centrally located and engage boxes 50, attached to the upright frame members 45. The journal 48 is provided with an opening, through which passes a spindle 51. This spindle, which is journaled in the casing, is provided with a sprocket-wheel 52 at its outer extremity and with a bevel-gear 53 at its inner extremity. This gear 53 meshes with a similar gear 54, fast on one of the journals of a worm 56, mounted on the casting and engaging a cogged rack 57 above. This rack is attached to the conveyer-frame and located at its longitudinal center. The top of the casting is grooved, as shown at 58, to receive the rack. Hence it is evident that if the spindle 51 be turned the conveyer-frame, to which the rack 57 is secured, will be shifted in the one direction or the other, according to the direction of the spindle's rotation. From the sprocket 21 on the shaft 19 a chain 59 leads to a sprocket 60, fast on a shaft 61, journaled in the frame and to whose opposite extremity is attached a friction-pulley 66, arranged to be brought into engagement with a friction-pulley 63, fast on a shaft 64, to which a sprocket 65 is also secured. In this manner the sprocket 65 may be actuated directly from the pulley 62, or the pulley 62 may be brought into contact with the friction-face of a pulley 66, which also engages the pulley 63. In this event the shaft 64 will be rotated in the opposite direction. The sprocket 65 is connected with a sprocket 52 by means of a chain 67, whereby the worm 56 may be actuated to shift the conveyer-frame in the one direction or the other, as may be required. The friction-pulley mechanism is manipulated through the instrumentality of a lever 68, attached to a rock-shaft 69, connected by a flexible joint 70 with a shaft 71, provided with a crank-arm 72, to which one extremity of a rod 73 is attached, the opposite extremity of the rod being connected with an eccentric bearing 74, through which the shaft 61 passes adjacent the friction-pulley 62.

Made fast to the trunnion 49 of the casting 46 is a depending segmental gear 75, whose cogged or toothed edge 76 is engaged by a worm 77, mounted on a shaft 78, journaled on the adjacent frame-casting 45. On the outer extremity of the shaft 78 is made fast a sprocket-wheel 79, connected by a chain 80 with a sprocket 81, fast on a shaft 82, provided with a bevel-gear 83, meshing with two gears 84 and 85, loose on a shaft 86, journaled in suitable bearings mounted on the base 12. The shaft 86 is constantly rotated when the apparatus is in use through the instrumentality of a chain 87, connecting sprockets on the shafts 19 and 86, respectively. When it is desired to operate the shaft 82, a clutch member 88 on the shaft 86 is shifted to engagement with one of the wheels 84 or 85, according to the direction of rotation desired, and this action of the shaft will through the instrumentality of the mechanism described operate the worm 77 and move the segmental gear 76 in the one direction or the other, according to the movement it is desired to give the conveyer-frame. The clutch member 88 is connected with a lever 89, the latter being connected with one extremity of a rod 90, whose opposite extremity is connected with a crank 91, fast on a shaft 92, connected by means of a flexible joint 93 with a rock-shaft 94, to whose outer extremity is made fast a lever-arm 95. The endless carrier 96 may be of any suitable construction. This carrier engages end drums 97. To one extremity of each drum is made fast a sprocket-wheel 98, engaged by an endless chain 99, which passes around a sprocket 100, fast on the driving-shaft 19. This operating-chain passes over guide-sprockets 101 and 102, suitably journaled on hangers 103, attached to the casting 46.

The flexible joints 18, 70, and 93 are all located in a vertical line passed through the axis of the base 12 at right angles thereto to permit the turning movement of the base and harmonize therewith.

The endless carrier, as shown in the drawings, consists of a series of plates or wings 104, made fast to spindles 105, whose extremities are journaled in boxes 106, made fast in links 107 of a chain 108. This construction of carrier is reversible, since it will operate equally well regardless of the direction in which it travels. Though we have shown a specific construction of carrier, it must be understood that the invention is not limited to any special construction, since any construction of carrier that may be reversed may be employed.

The manner of manipulating the friction-pulley 62, whereby it is made to engage either the pulley 63 or the pulley 66, is shown in Fig. 11. The rod 73 is connected with a lever 73ª, made fast to the eccentric bearing 74, journaled in a suitable stationary box. The shaft 61 is journaled in the eccentric bearing 74. Hence by giving the bearing 74 a partial turn in the one direction or the other the face of the friction-pulley 62 may be brought to engagement with the pulley 63 or the pulley 66 for the purpose heretofore explained.

From the foregoing description the manner of operating our improved box-car loader will be readily understood. The foundation 10 and the rollers 7, upon which the movable platform is mounted, are suitably located adjacent the car-track, the platform extending at right angles or approximately at right angles to the track. The end of the platform containing the revoluble base 12 is nearest the track. The car to be loaded is run along on the track and stopped at the end of the platform. The conveyer is first tilted to occupy the position shown in Fig. 4 in order that it may enter the car-doorway. This is accomplished by using the hand-lever 95 to actuate the rock-shafts 94 and 92, whereby the rod 90 is made to shift the clutch 88 to operate a gear 84 or 85 and turn the gear 87, whereby motion is communicated to the shaft 82 and thence to the shaft 78 through the instrumentality of the parts heretofore described. The shaft 78 operates the worm 77 to actuate the segmental gear 75, whereby the conveyer is tilted by virtue of the construction and arrangement of parts already set forth. The platform 5 is first moved endwise, whereby its extremity, carrying the base 12 and the loader mechanism, is moved into the car. This is accomplished by virtue of a clutch, a shaft 15, reversible gears 36, 37, and 38, a shaft 39, a pinion 40, a gear 41, and a rack 44. The mechanism being now in the car, the conveyer is tilted to occupy the desired position—say a horizontal or approximately a horizontal position. It is then moved endwise in either direction on the casting or cross-head 46 by virtue of the friction-gears 61, 63, and 66, the sprockets 65 and 52, the chain 67, the spindle 51, gears 53 and 54, worm 56, and rack 57. The coal or other material to be loaded is now discharged upon the endless carrier, which is operated from the shaft 19 by the sprocket 100 and the chain 99 engaging the intermediate sprockets 101 and 102 and passing around the end drums 97. When one end of the car is sufficiently filled at the center, the conveyer is turned to fill the adjacent corners one at a time by turning the base 12 sufficiently to accomplish this purpose. This is done by virtue of the worm 24 engaging the circular rack 23, formed on the base 12. The worm is actuated by turning the shaft 25, which is connected with the line-shaft 15 by suitable reversing-gears, as heretofore described. When one end of the car is properly loaded, the conveyer may be shifted in the opposite direction and the other end of the car loaded in like manner. When the work of the loader is completed, the conveyer is tilted to the proper position and removed from the car by reversing the endwise movement of the platform.

Having thus described our invention, what we claim is—

1. In an apparatus of the class described, the combination with a stationary foundation, a platform movable thereon and arranged to project into the door of a car, and a suitable framework mounted on the platform and adapted to enter the car, of a conveyer adjustable endwise on said frame, and suitable means mounted on the frame for moving the conveyer endwise in either direction independently of gravity, said means being adapted to automatically hold the conveyer in any desired position of adjustment.

2. In a box-car loader, the combination with a stationary foundation, a platform movable thereon and arranged to project into the door of the car, a framework mounted on the end of the platform and adapted to project into the car therewith, of a block or cross-head trunnioned on said frame, a conveyer adjustable on the cross-head, a worm mounted on the cross-head, and a rack fast on the conveyer and engaged by the worm of the cross-head for imparting an endwise movement to the conveyer in either direction independently of gravity.

3. In a box-car loader, the combination with a suitable stationary foundation, of a platform movable endwise thereon, a framework mounted on one end of the platform and adapted to enter the door of the car as the platform is properly shifted, a block or cross-head trunnioned on the frame, a gear fast on one trunnion of the cross-head, means for operating the gear to tilt the cross-head, a conveyer mounted on the cross-head and adjustable endwise thereon, and means mounted on the cross-head for shifting the conveyer endwise in either direction independently of gravity for the purpose set forth.

4. The combination with a suitable foundation, of a platform movable endwise thereon, a rack-and-gear connection for shifting the platform on the foundation, a frame mounted on one end of the platform and adapted to enter the door of a box-car, a cross-head trunnioned on said frame, a segmental gear fast on the trunnion of the cross-head, means for operating the gear, a conveyer adjustable on the cross-head, and means mounted on the frame, for adjusting the conveyer endwise in either direction independently of gravity.

5. In a box-car loader, the combination with a suitable foundation, of a platform movable endwise thereon, a framework mounted on one end of the platform and adapted to enter the door of the car, a block or cross-head trunnioned on the frame, a gear fast on a trunnion of the cross-head, means for operating the gear, a conveyer arranged to turn with the cross-head and adjustable endwise thereon, and suitable means mounted on the cross-head and engaging the conveyer, for shifting the latter endwise thereon independently of gravity.

6. In a box-car loader, the combination with a suitable foundation located in suitable proximity to the car, of a platform movable endwise on the foundation, and having one extremity adapted to enter the door of the car, a frame mounted on the platform and adapted to enter the car therewith, a conveyer-frame adjustable endwise on the cross-head, drums carried by the frame, an endless conveyer mounted on the frame and engaging the drums, and means mounted on the cross-head and engaging the conveyer-frame for shifting the latter independently of gravity in either direction, said means being connected and arranged to automatically hold the conveyer in any desired position of adjustment.

7. The combination with a suitable foundation, of a platform movable endwise thereon, a framework mounted on the platform and adapted to enter the door of a box-car, a block or cross-head mounted on said frame, a conveyer-frame adjustable endwise on the cross-head, an endless traveling carrier mounted on the conveyer-frame, a rack on the conveyer-frame, and a worm mounted on the cross-head and engaging the rack for shifting the conveyer endwise thereon in either direction.

8. The combination with a suitable frame, of a cross-head trunnioned thereon, a conveyer slidable on the cross-head and provided with a rack, a worm mounted on the cross-head and engaging the rack, and a spindle passing through a trunnion of the cross-head for operating the worm.

9. The combination with a framework, of a cross-head trunnioned thereon, a conveyer slidable on the cross-head, a rack on the conveyer, a worm on the cross-head engaging said rack, a spindle passing through the trunnion of the conveyer for operating the worm, and reversible means for operating the spindle whereby the latter may be rotated in the one direction or the other, according to the direction it is desired to shift the conveyer.

10. In a box-car loader, the combination with a suitable foundation located in suitable proximity to the car, of a platform movable endwise on the foundation, a frame mounted on one end of the platform and adapted to enter the door of a car, a cross-head mounted on the frame, a conveyer adjustable endwise on the cross-head, a worm-gear connection between the frame and the conveyer for shifting the latter endwise in either direction independently of gravity, end drums mounted on the conveyer-frame and provided with sprockets, an endless carrier engaging the drums, and driving-shafts provided with sprockets, intermediate sprockets mounted on the cross-head, and an endless chain engaging all of said sprockets for supporting the carrier.

11. The combination of a platform, a line-shaft mounted thereon, a base mounted to turn on the platform, a driving-shaft, a flexible joint between the line-shaft and the driving-shaft, said joint being located in a vertical line passed through the axis of the base at right angles thereto, with a frame mounted on the base, and a conveyer movable on the frame and provided with an endless carrier, and a suitable connection between the driving-shaft and the endless carrier for operating the latter.

12. The combination with a platform and a line-shaft mounted thereon, of a base adapted to turn on the platform, a driving-shaft mounted on the base, a flexible joint connecting the two shafts and located in a line passed through the axis of the base perpendicular to the latter, a frame mounted on the platform, a conveyer slidable endwise on the platform, and means connected with the driving-shaft for shifting the conveyer.

13. In a box-car loader, the combination with a suitable foundation located in proximity to the car, a platform movable on the foundation, a line-shaft mounted on the platform, a turnable base on one end of the platform, a driving-shaft mounted on said base, a framework mounted on the base, a conveyer pivotally mounted and adjustable endwise on the frame, means connected with the driving-shaft for tilting the conveyer on the frame, and means mounted on the frame and engaging the conveyer for shifting the same endwise thereon in either direction independently of gravity for the purpose set forth.

14. The combination with a platform and a line-shaft mounted thereon, of a base turnable on the platform, a driving-shaft mounted on the base, a flexible connection between the two shafts in a line passed through the axis of the base perpendicular thereof, a frame mounted on the base, a conveyer mounted to turn on the frame, and also movable endwise thereon, and means connected with the driving-shaft for tilting and shifting the conveyer substantially as described.

In testimony whereof we affix our signatures in presence of two witnesses.

WILLIAM A. SMITH.
WILLIAM R. HARP.

Witnesses:
DORA C. SHICK,
MARY C. LAMB.